United States Patent [19]

Durand

[11] Patent Number: 5,195,368
[45] Date of Patent: Mar. 23, 1993

[54] SIGNAL PICKUP MECHANISM

[76] Inventor: John E. Durand, 26581 Dolorosa, Mission Viejo, Calif. 92691

[21] Appl. No.: 604,817

[22] Filed: Oct. 29, 1990

Related U.S. Application Data

[63] Continuation-in-part of Ser. No. 235,563, Aug. 24, 1988, Pat. No. 5,024,085.

[51] Int. Cl.⁵ .............................................. G01F 3/08
[52] U.S. Cl. .................................... 73/256; 324/226
[58] Field of Search ................. 73/223, 224, 239, 247, 73/236, 237, 649, 651, 861.54, 861.77, 861.78, DIG. 1, DIG. 5; 324/207.12, 207.13, 226, 228

[56] References Cited

U.S. PATENT DOCUMENTS 3,253,459  5/1966  Sorenson et al. ............. 73/861.54 X
4,379,226  4/1983  Sichling et al. ................. 73/DIG. 1

Primary Examiner—Herbert Goldstein

[57] ABSTRACT

A magnetic signal pickup mechanism is presented. The mechanism comprises a moving magnetic element mass fixedly coupled to a moving element mass such as a nutator. A movable magnetic element wire is physically non rigidly coupled magnetically to the moving magnetic element mass and further coupled mechanically to quasi restrictive longitudinal pivot points wherein the pivot points restrain longitudinal movement in relation to the moving magnetic element mass, the pivot points being offset sufficiently distant from each other to prevent contact between the wire and any structure other than the pivot points, wherein the wire is non straight.

2 Claims, 1 Drawing Sheet

SIGNAL PICKUP MECHANISM

The present application is a continuation in part of my previously filed application, Ser. No. 07/235,563, filed Aug. 24, 1988, now U.S. Pat. No. 5,024,085.

BACKGROUND OF THE INVENTION

1. Field of the Invention

The present invention relates to signal pickup mechanisms, and more particularly to magnetic pickup mechanisms useful in picking up signals from nutators and the like at widely varying frequencies.

2. Description of the Prior Art

The prior art comprises my application Ser. No. 07/235,563 and the art cited therein and in the file thereof. Application Ser. No. 07/235,563 described a signal pickup mechanism useful at reduced flow meter pickup frequencies. The wire motion therein described was dependant in part on such factors as surface finish of the containing tube, prior wire location, wire straightness, longitudinal wire movement, etc., and did not always furnish a large regular relatively noise free signal. Additionally, basic Newtonian physics rules relating to inertia dictate that as motion frequency in a system such as described therein increases, motion amplitude decreases, thereby making it more difficult to detect by use of prior art and current art signal detectors.

SUMMARY OF THE INVENTION

A moving magnetic element pivoting non straight wire has a first end coupled physically to a first pivot point and a second end coupled to a second pivot point. The wire is coupled magnetically to a moving magnetic element mass. Physically non rigidly coupled means the wire is mechanically coupled at each end, but free to move in a prescribed path. Quasi restrictive means the wire can move so long as the two ends of the wire are free to rotate within the pivot points. The purpose and function of the pivot points is to restrain longitudinal movement of the movable magnetic element wire in relation to the moving magnetic element mass. The motion is caused by influence of the moving of the movable magnetic element mass. The pivot points are offset sufficiently distant from each other to prevent contact between the movable magnetic element wire and any structure other than the pivot points. The length of the wire exceeds the distance between the two ends of the wire so that the wire is non straight. Non straight is defined as curved, bent, etc., so that the wire is no longer than a straight line between the ends of the wire. The wire is influenced by magnetic forces and therefore attempts to track the moving magnetic element mass generated moving magnetic forces and remain as close as possible to the moving magnetic element mass. At least one of the movable magnetic element wire and the moving magnetic element mass is magnetic and the other is one but not both of magnetic and ferromagnetic.

Another example of the magnetic signal pickup mechanism of the present invention comprises:

A moving magnetic element mass comprises a permanent magnet fixedly coupled to a moving element which moving element by moving causes the magnetic element mass to move.

A movable magnetic element wire is coupled magnetically to the moving magnetic element mass wherein the magnetic element mass comprises a permanent magnet sufficiently powerful so that the movable magnetic element wire moves as a function of proximate passes of the moving magnetic element mass, thereby generating an electrical current in the movable magnetic element wire.

A third magnetic element comprises one of a magnet and a ferromagnetic element selectively fixedly positioned near the movable magnetic element wire to amplify the amplitude of movable magnetic element wire movement as a function of movement of the moving magnetic element mass.

DRAWING DESCRIPTION

Reference should be made at this time to the following detailed description which should be read in conjunction with the following drawings of which:

Figure 1:
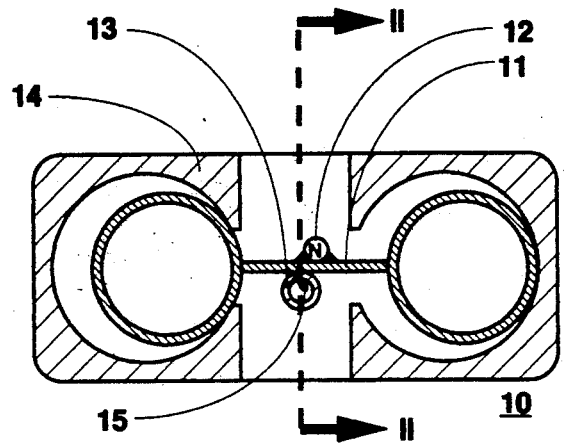
FIG. 1 is a partially cut away end view of the invention along the line I—I of FIG. 2.
Figure 3:
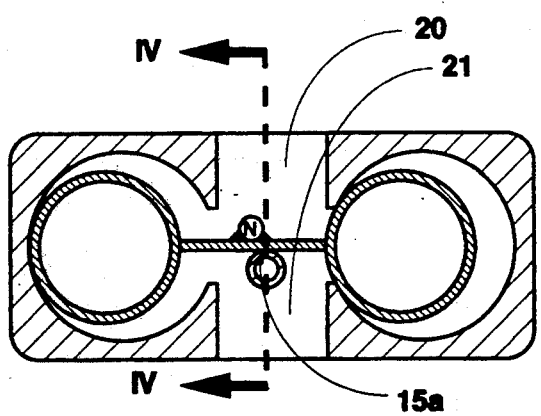
Figure 4:
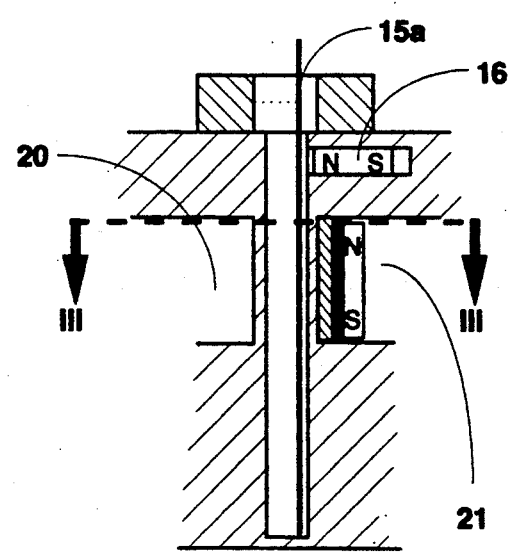

FIG. 3 is a partially cut away end view of a prior art signal pickup mechanism along the line III—III of FIG. 4 illustrating where a straight wire typical of the prior art is positioned in an embodiment of a prior art device and may be compared with FIG. 1; and FIG. 4 is a partially cut away side view of the prior art signal mechanism of FIG. 3 along the line IV—IV, except that it has an additional magnet not visible in FIG. 3 added according to the present invention.

DETAILED DESCRIPTION OF THE INVENTION

A magnetic signal pickup mechanism 10 is presented. The magnetic signal pickup mechanism 10 comprises the following elements and relationships;

A moving magnetic element mass 12 is fixedly coupled to a moving element mass 11 such as a nutator 11. While the present invention is designed primarily for use with nutators, the concepts of the invention have far broader applications.

Figure 2:
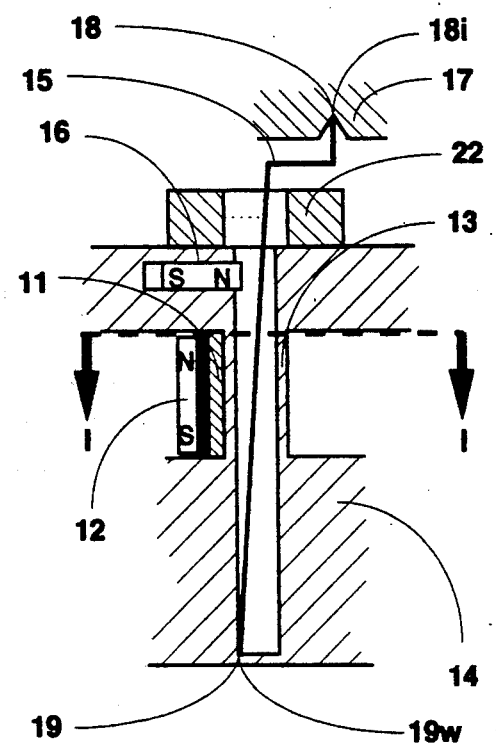
FIG. 2 is a partially cut away side view of the invention of FIG. 1 along the line II—II of FIG. 1.

A moving magnetic element pivoting non straight wire 15 has a first end 18 coupled physically to a first pivot point 18i and second end 19 coupled to a second pivot point 19w. The wire 15 is coupled magnetically to a moving magnetic element mass 12. As shown in FIG. 2, physically non rigidly coupled means the wire 15 is mechanically coupled at each end, but free to move in a prescribed path. Quasi restrictive means the wire 15 can move so long as the two ends 18i, 19w of the wire are free to rotate within the pivot points 18, 19. The purpose and function of the pivot points 18, 19 is to restrain longitudinal movement of the movable magnetic element wire 15 in relation to the moving magnetic element mass 12. The motion is caused by influence of the movement of the moving magnetic element mass 12. The pivot points 18, 19 are offset sufficiently distant from each other to prevent contact between the movable magnetic element wire 15 and any structure other than the pivot points 18, 19.

The length of the movable magnetic element wire 15 exceeds the distance between the two ends 18i, 19w the movable magnetic element wire 15 so that the movable magnetic element wire 15 is non straight. Non straight is defined as curved, bent, etc., so that the movable element wire 15 is longer than a straight line between the ends 18i, 19w of the movable magnetic element wire 15. The movable magnetic element wire 15 is influenced by magnetic forces and therefore attempts to track the moving magnetic element mass 12 generated moving magnetic forces and remain as close as possible to the moving magnetic element mass 12. At least one of the movable magnetic element wire 15 and the moving magnetic element mass 12 is magnetic and the other is one but not both of magnetic and ferromagnetic.

Another example of the magnetic signal pickup mechanism 10 of the present invention comprises:

A moving magnetic element mass 12 which in turn comprises a permanent magnet 12 fixedly coupled to a moving element 11 which moving element 11 by moving causes the magnetic element mass 12 to move.

A movable magnetic element wire 15 is coupled magnetically to the moving magnetic element mass 12 wherein the moving magnetic element mass 12 comprises a permanent magnet 12 sufficiently powerful so that the movable magnetic element wire 15 moves as a function of proximate passes of the moving magnetic element mass 12, thereby generating an electrical current in the movable magnetic element wire 15.

If the moving magnetic element mass 12 and the movable magnetic element wire 15 moved identically so there was no relative motion between them, no current would be generated in the movable magnetic element wire 15 by relative movement of the moving magnetic element mass 12. While the movable magnetic element wire 15 attempts to follow the moving magnetic element mass, inertia causes the movable magnetic element wire 15 to move not quite identically with the moving magnetic element mass 12 so there is relative motion between them, causing a current to be generated by relative motion of the moving magnetic element mass 12 in the movable magnetic element wire 15.

A third magnetic element 16 comprises one of a magnet 16 and a ferromagnetic element 16 selectively fixedly positioned near the path of the movable magnetic element wire 15 to amplify the amplitude of movable magnetic element wire 15 movement as a function of movement of the moving magnetic element mass 12.

The moving magnetic element mass 12 induces an electrical current in the movable magnetic element wire 15. The movable magnetic element wire 15 electrical current causes an electro magnetic field. The interaction of the induced electro magnetic field with the magnetic field of the magnetic element 16 together with pure magnetic induction forces amplifies the amplitude of movement of the movable magnetic element wire 15, thereby improving the signal to noise ratio as sensed by a prior art or current art sensor 22. The term moving indicates that the moving magnetic element mass 12 moves and is the active of the coupled pair of mass 12 and wire 15. The term movable indicates that the wire 15 is capable of responding to movement of the mass 12.

Experimental data has shown that wire 15 amplitude movement is greater at higher frequencies as a function of the distance between the wire 15 and the magnetic element 16.

A particular example and sub example of the invention have been described herein. Others will be obvious to those skilled in the art. The invention is limited only by the following claims.

I claim:

1. A magnetic signal pickup mechanism, comprising: a moving mass fixedly coupled to a moving element; a movable element wire, wherein one of the mass and wire is magnetic and the other is one of magnetic and ferromagnetic, the movable element wire coupled magnetically to the moving mass and further the ends of the movable element wire coupled mechanically to pivot points wherein the pivot points restrict longitudinal movement of the movable element wire in relation to the moving mass, the pivot points being offset sufficiently distant from each other to prevent contact between the movable element wire and any structure other than the pivot points wherein the length of the movable element wire exceeds the distance between the two ends of the movable element wire so that the movable element wire is non straight, wherein the movable element wire attempts to track the moving mass generated magnetic forces and remain as close as possible to the moving mass.

2. The invention of claim 1, further including a third magnetic element comprising one of a magnet and a ferromagnetic element selectively fixedly positioned near the movable element wire path to interact with the magnetic and electromagnetic fields about the movable element wire to amplify the amplitude of movable element wire movement as a function of movement of the moving mass.

* * * * *